(12) United States Patent
Siedel

(10) Patent No.: US 6,427,167 B1
(45) Date of Patent: Jul. 30, 2002

(54) METHOD FOR IDENTIFYING AND INITIALIZING DEVICES WHICH EXCHANGE DATA WITH EACH OTHER AND WITH A DATA PROCESSOR IN A COMMUNICATION NETWORK

(75) Inventor: Bernd Siedel, Forchheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/247,920

(22) Filed: Feb. 11, 1999

(30) Foreign Application Priority Data

Mar. 19, 1998 (DE) .......................... 198 12 163

(51) Int. Cl.⁷ .................. G06F 15/177; G06F 15/16
(52) U.S. Cl. ...................... 709/222; 709/227
(58) Field of Search .................... 709/222, 221, 709/223, 230, 232, 227, 228; 714/48; 340/825; 370/400

(56) References Cited

U.S. PATENT DOCUMENTS

| 4,918,690 A | * | 4/1990 | Markkula .................... 370/400 |
| 5,150,464 A | * | 9/1992 | Sidhu ......................... 709/222 |
| 5,371,897 A | * | 12/1994 | Brown ......................... 709/222 |
| 5,636,342 A | * | 6/1997 | Jeffries ....................... 714/48 |
| 5,787,246 A | * | 7/1998 | Lichtman .................... 709/222 |
| 6,163,806 A | * | 12/2000 | Viswanathan ................ 709/229 |
| 6,166,653 A | * | 12/2000 | Schulmeyer ................ 340/825 |
| 6,189,102 B1 | * | 2/2001 | Beser ......................... 713/201 |

OTHER PUBLICATIONS

Farsi, M.; Ratcliff, K. "An introduction to CANopen communication issues". Can open Implementation (Digest No. 1997/384), IEE Colloquium Oct. 6, 1997 pp. 2/1–2/6.*

"Der Feldbus in der Maschinen–und Anlagentechnik," Borst, Franzis–Verlag GmbH & Co., KG Munich, 1972, ISBN 3-7723-4621-9, pp. 55–58.

Farsi, M.; Ratcliff, K. "An introduction to CANopen communication issues". Can open Implementation. 1997 the Institution of Electrical Engineers. IEE, Savoy place, London WC2R oBL, UK.*

* cited by examiner

Primary Examiner—Glenton B. Burgess
Assistant Examiner—Kenneth W. Fields
(74) Attorney, Agent, or Firm—Schiff Hardin & Waite

(57) ABSTRACT

In a method for identifying and initializing devices that are connected to a communication system for data exchange with one another and with a data processing unit, the data processing unit checks whether the node number of a device in the logon of the device is unique for the communication via the communication system and if a node number is found that is not unique, the data processing unit requests that the device which transmitted to a non-unique node number change its node number to a unique node number.

11 Claims, 4 Drawing Sheets

METHOD FOR IDENTIFYING AND INITIALIZING DEVICES WHICH EXCHANGE DATA WITH EACH OTHER AND WITH A DATA PROCESSOR IN A COMMUNICATION NETWORK

BACKGROUND OF THE INVENTION

1. Field of the Invention

The present invention is directed to a method for identifying and initializing devices that are connected to a communication system for data exchange with each other and with a data processing means.

2. Description of the Prior Art

In order to enable the data exchange between various devices, which may be devices of different manufacturers as well, and a data processing means that, for example, form a workstation with one another, for example a medical workstation, it is known to employ a communication system to which the devices and the data processing means are connected. The communication system represents an interface between the devices as well as between the devices and the data processing means and, dependent on its hardware configuration, i.e., for example, the number of its data and control lines, the system has a characteristic communication protocol that is employed for data transmission between the devices, or between the devices and the data processing means. Various communication systems with specific communication protocols have been developed for various technical fields of application.

Every device connected to a communication system usually has an identifier referred to as a node number allocated to it, this also being referred to as a "node ID", so that data or information that are provided for this device can be unambiguously (uniquely) allocated to the device by the communication system and thus can be transmitted thereto. A fixed allocation of the node numbers to the respective devices exists and this can be accomplished by hardware or software switches of the communication system. A type of fixed allocation list thus exists which defines the node number for each device.

For the connection of a further device to the communication system it has proven disadvantageous that an intervention, for example of a system administrator, is required to allocate a new node number to this further device. Only after a new node number has been assigned by the system administrator can the device be accepted into the operation of the communication system with a hardware or software switch of the communication system.

Given such an assigning of node numbers to devices by a person, there is also the risk that two devices will inadvertently receive the same node number, and thus data and information could be misrouted. For example, control commands that are only provided for one specific device could also be communicated unintentionally to another device, which may cause damage to the device or other equipment. Such an error would be especially critical in the medical field if misrouted control commands unintentionally trigger actions of a treatment or examination device that jeopardize the health of patients and/or personnel. An example would be the unintended triggering of the emission of X-rays by an X-ray source.

A method for the management of network addresses in a field bus system is described, for example, in "Der Feldbus in der Maschinen-und Anlagentechnik", W. Borst, Franzis Verlag GmbH & Co. KG, Munich 1992, ISBN 3-77234621-9, pages 55–58. This field bus system has a network management and field devices that must be incorporated into the field bus system after the start-up in order to be able to communicate via the field bus system. The network management implements an addressing of a device with a device name (test location designation), this device name having been programmed in the field device and entered in the network management, and subsequently replaces the device name with a network address. The network management, however, can only involve field devices in the operation of the field bus system about which it has been informed by an appropriate input procedure, again requiring the intervention of a system administrator.

U.S. Pat. No. 5,150,464 discloses a method for the introduction of a device connected to a communication system into the operation of the communication system. The communication system has local area networks (LANs) and token ring networks, and the communication between the networks ensues via devices known as routers. In the method disclosed in U.S. Pat. No. 5,150,464, in order for a device, which is a part of one of the networks, to be accepted into the communication system, the device itself generates network addresses according to a random principle and transmits these addresses until it has generated a valid network address. At this point, it no longer receives an answerback from another device of the network in which the device in question is operated, or from a router connected to the network, indicating that the last-generated network address is already being used.

SUMMARY OF THE INVENTION

An object of the present invention is to provide a method of the type initially described wherein intervention of a person (human intervention) is avoided when assigning a node number to the device, and wherein a unique allocation of a node number to a device is nevertheless assured.

This object is inventively achieved in a method for identifying and initializing devices that are connected to a communication system for data exchange with one another and with a data processing means, having the following steps. A logon signal comprising a node number and an identification identifier is transmitted from every device connected to the communication system to the data processing means. The node number of each and every device is checked with the data processing means for uniqueness. Given a non-unique node number of one of the devices, an unambiguous node number for that device is defined with the data processing means on the basis of the identification identifier of the device. An answerback of the node number to the devices is produced by the data processing means. An acknowledgment of the node numbers to the data processing means is given by the devices. The devices are introduced into the operation of the communication system.

Inventively, thus, there are no fixed allocations of node numbers to individual devices on the part of the data processing means, which monitors and controls the identification and initialization of devices. On the contrary, the allocation of the node numbers to the devices ensues variably by the data processing means itself and without intervention of a person, with the definition of a new, unique node number for a device ensues with the data processing means given a non-unique node number of the device. It is assured that two devices do not inadvertently receive the same node number, thereby preventing the misrouting of information. Moreover, a security inquiry assures that a device is accepted into the operation of the communication system only when the device has confirmed the node number for the data processing means.

In an embodiment of the invention the communication system is CANOPEN, which can be obtained as so-called freeware, and that, due to its high operating stability, is especially suited for critical areas of employment, for example in the medical field wherein the health of patients and personnel must be protected.

In a version of the invention the communication between the devices and the data processing means is based on standard services of the communication system. A "standard service" is a communication signal that is defined for the communication system and with which information can be communicated. As a result, no new services of the communication system have to be defined for the inventive method for identifying and initializing devices connected to the communication system. In the case of CANOPEN, in a version of the invention suited therefor, a so-called emergency signal is employed as the logon signal for the devices and a so-called SDO (service data object) signal is employed as the communication signal for the data processing means.

According to another embodiment of the invention, the identifier of the logon signal contains encoded information. Therefore, no extensive dataset of information about the device, for example the serial number and the manufacturer's name of the device, has to be transmitted by the data processing means for the identification of a device, but only an encoded message, which is usually abbreviated with respect to the scope of the data and allows the identification of the device. According to one version of the invention, an ASCII string comprising, for example, the serial number and the manufacturer's name, is allocated to each device for identification, this being converted into a number with a HASH function of the programming language C, with at least some of the digits of the number forming the identifier of the device. With a HASH function that, for example, can be taken in various forms from libraries of the programming language C, thus, an ASCII string, i.e. a character string composed, for example, of alphanumerical characters, can be converted into a number that can serve as the identifier of the device. For example, the least significant four digits of the number can form the identifier of the device in the case of CANOPEN, so that the identifier advantageously has only a small data content. The HASH function preferably converts the ASCII string into a hexadecimal number that is transmitted to the data processing means in the logon signal together with the node number of the respective device.

In another version of the invention the transmission of the logon signal ensues cyclically from every device connected to the communication system to the data processing means. The cyclical transmission of the logon signal assures that the data processing means in fact registers the logon attempt of a device and accepts the logon.

In another embodiment of the invention, in the extremely improbable case that two devices transmit a logon signal with the same node number and the same identifier, the data processing means checks on the basis of the cyclical occurrence of logon signals whether a number of devices with identical logon signals are present and, if so, requests that the corresponding devices change their identification identifier. The corresponding devices thereby again apply the HASH function to their ASCII string with the variation of one variable. As a result, a new identification identifier is then present, which the corresponding devices retransmit to the data processing means in the logon signal. It is thus assured that, given logon signals of a number of devices with the same node number, each such device is modified to exhibit a unique identifier.

In a further version of the invention, the data processing means provides a range of node numbers respectively for devices of substantially the same type. When, for example, a number of devices of the same type log on at the data processing means with the same node number, the data processing means defines a new node number for each of the devices, these node numbers of the devices being unique and within the provided range for the respective device type. The provision of a range of node numbers for a device type is advantageous because it allows an immediate determination to be made as to how devices of a particular type are connected to the communication system given an query of node numbers.

The data processing means can be a microcontroller arranged on a PC plug card and the devices can be medical devices of a medical workstation. The inventive method is thus advantageously suited for the medical field of application that is critical in view of safety aspects for patients and personnel.

DESCRIPTION OF THE PREFERRED EMBODIMENTS

Figure 1:
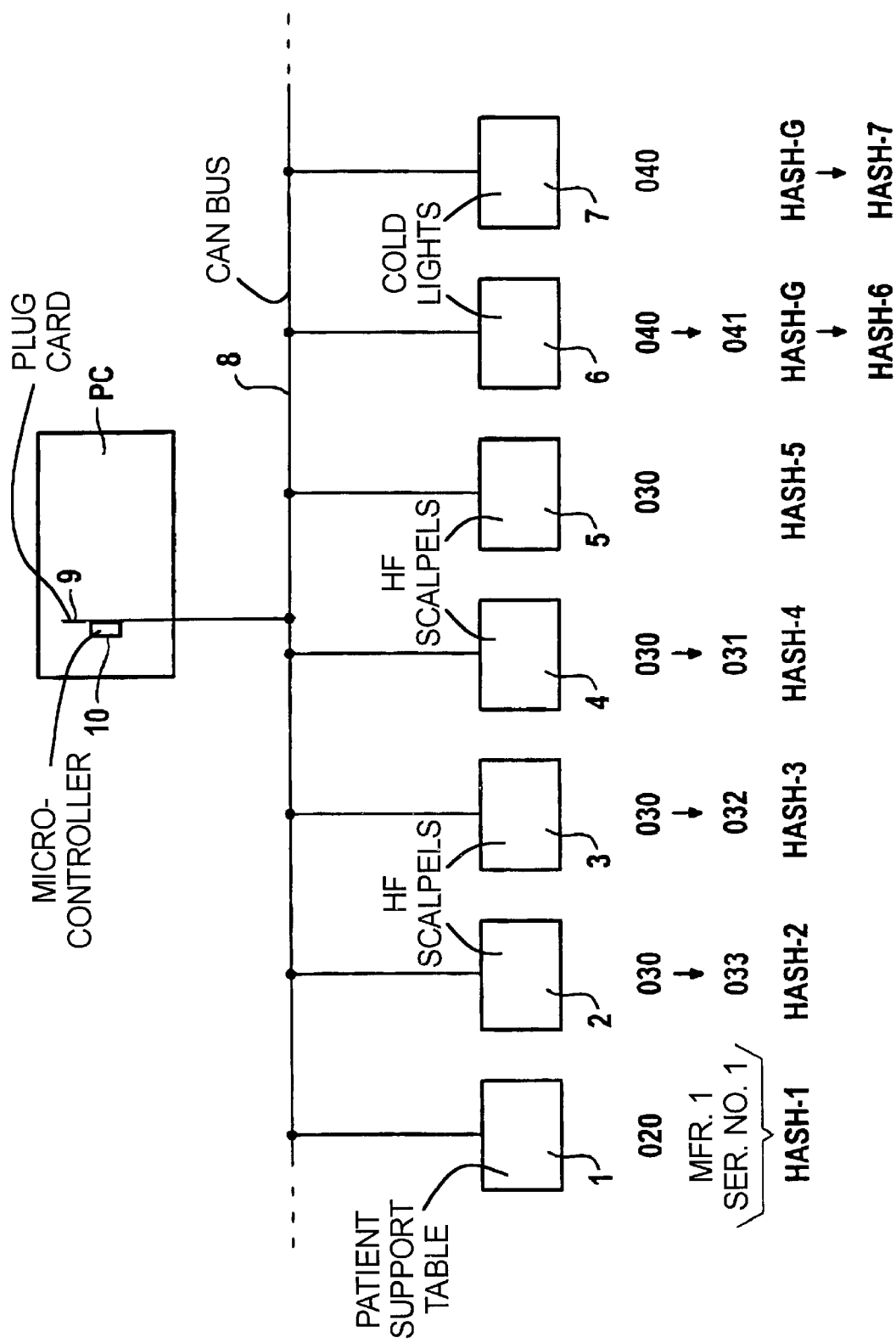
FIG. 1 is a block diagram illustration of a medical workstation with medical devices connected to a communication system operating in accordance with the inventive method.

FIG. 1 shows a medical workstation with seven medical devices 1 through 7 as an exemplary embodiment for describing the inventive method. The medical devices, of which device 1 is a patient support table, devices 2 through 5 are HF scalpels and devices 6, 7 are cold lights, are connected to a communication system. In the exemplary embodiment, the communication system is CANOPEN, referred to below as can-bus 8, which has a two-wire line that is not shown in the Figures.

A data processing means in the form of a microcontroller 10 that is arranged on a PC plug card 9 accepted in a PC is also connected to the can-bus 8. The microcontroller 10 serves for identifying and initializing devices connected to the canbus 8 and for controlling the data exchange between the devices 1 through 7 and the microcontroller 10. The data exchange ensues using the known communication protocol of the can-bus 8.

Figure 2:
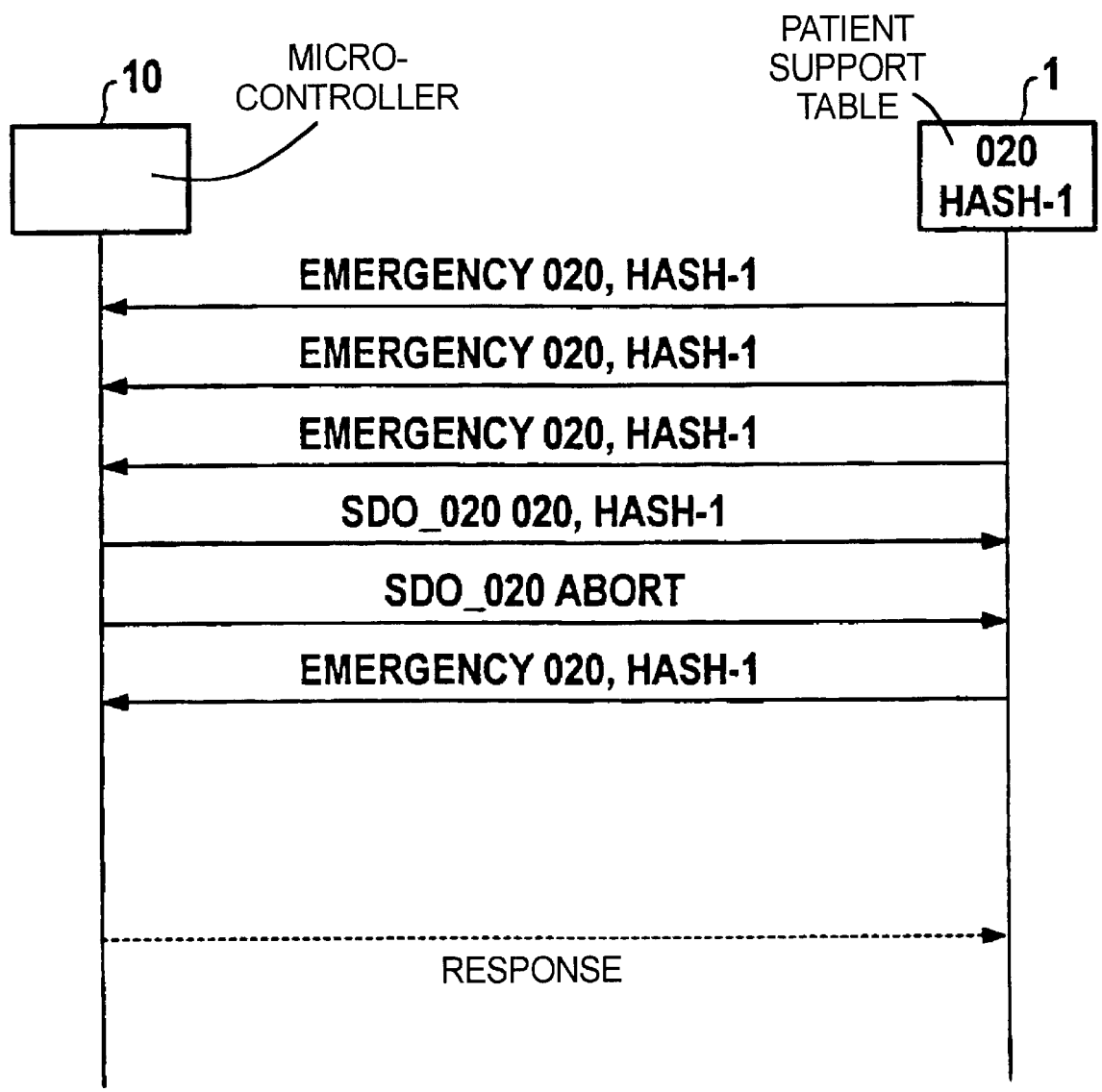
FIG. 2 is a schematic illustration of the executive sequence of a logon of a device at the communication system of FIG. 1.

With reference to the example of the device 1, the inventive method for identifying and initializing a device that is connected to the can-bus 8 for data exchange with the microcontroller 10 and other devices is explained below on the basis of FIG. 2.

In the exemplary embodiment, the device 1 has a node number 020, a manufacturer's name 1 and a serial number 1.

After connection of the device 1 to the can-bus 8 or after the system composed of the devices 1 through 7, the can-bus 8 and the PC is activated, the device 1 is at first in the "pre-operational" operating status, i.e. it is not yet ready for a communication mode via the can-bus 8 since the device 1 is still unknown to the microcontroller 10. During the course of the logon at the microcontroller 10, the device 1 therefore transmits a logon signal for the operation of the device 1 via the can-bus 8 in the form of an emergency signal. The emergency signal is a standard service of the can-bus 8, and thus it is not a service that is specifically defined for the logon but can be employed therefor.

The emergency signal keeps eight bytes on hand for the transmission of information, all of which are indicated in hexadecimal numbers in the exemplary embodiment. The hexadecimal number 0F0H resides in byte zero, this serving in the exemplary embodiment as an identifier for assigning node numbers to devices, i.e. serving for the identification and initialization of devices or the switch from the preoperational status into the operational status. This identifier is allowed to be employed only in the assigning of node numbers, i.e. before the operational status of the devices is reached, and is no longer allowed later. The node number of a device that wants to log on at the microcontroller 10 resides in byte one. A range from 2 through 125 is allowed for the node numbers in the exemplary embodiment. In the exemplary embodiment, bytes two and three have no significance for the procedure of initialization and identification. The identifier of the device that wants to log on at the microcontroller 10 resides in bytes four through seven. In the exemplary embodiment, the identification number contains abbreviated, encoded information about the device that still allows the device to be identified. The identifier of a device is thereby determined from an ASCII string that is allocated to a device. In the exemplary embodiment, the ASCII string comprises the manufacturer's name for the device with a maximum of nineteen characters and the serial number of the device with a maximum of eight characters. A function known as a HASH function of the programming language C, which can be taken in various forms from C libraries, converts the ASCII string—comprising alphanumerical characters in the present exemplary embodiment—into a hexadecimal number.

The following function is an example of a suitable HASH function that can be taken from a C library:

$$E(m)=(\text{SHIFT LEFT } ASCII(n))+ASCII(n)*5)+m+E(m-1)$$

with n length of the string m loop counter

E(m) loop result of the HASH function.

The HASH function is applied to a corresponding ASCII string having the length n and is processed in a loop. A hexadecimal number composed of the loop results is thus obtained, the four least significant digits thereof forming the identifier of the device in the exemplary embodiment. Exactly one of the four digits thereby resides in each of the bytes four through seven.

In the following comments about this and other exemplary embodiments, the content of emergency signals shall be indicated only insofar as necessary for distinguishing the device from which such an emergency signal proceeds and what information is to be communicated to the microcontroller 10. Therefore, only the byte one with the node number of the device and the content of bytes four through seven with the identification identifier as HASH-X will be indicated. HASH-X thereby stands for the least significant four digits of the result of the HASH function that was applied to the ASCII string of the device comprising the manufacturer's name and the serial number of the device.

In the exemplary embodiment, thus, the emergency signal of the device 1 has the abbreviated form EMERGENCY 020, HASH-1 employed below. This means that device 1, namely the patient support table of the medical workstation, has the node number 020 and the identifier HASH-1. The device 1 cyclically transmits this emergency signal over the can-bus 8 at time intervals of one second. As a rule, the microcontroller 10 first reacts to the second emergency signal of the device 1 having the same content. Together with the emergency signal of the device 1, the microcontroller 10 receives the node number 020 and the identifier HASH-1 of the device 1 and checks whether the node number is unique for the device 1 with the identifier HASH-1, i.e. has not yet been assigned. When this is the case, the microcontroller sends two SDO signals to the device 1 as a reply to the emergency signal, these two SDO signals likewise being standard services of the can-bus 8.

The first SDO signal has the content SDO_XXX with XXX as a space holder for the node number of the device to be addressed, followed by eight bytes that are provided for the communication of further information in the form of hexadecimal numbers. No information relevant for the method of identification and initialization of devices resides in byte zero of the SDO signal. The hexadecimal digits 2110 reside in byte one and two, standing as the identifier for the assigning of node numbers in the present exemplary embodiment. Two different types of information can reside in byte three of the SDO signal. In one instance, the node number that the microcontroller 10 assigned to the respective device resides in byte three. In another instance, the identifier OFO (hexadecimal), with which the microcontroller 10 solicits the respective device to again apply the HASH function to its ASCII string upon variation of a variable, resides in byte three (this case shall be discussed later). In the exemplary embodiment, the node number that is to be communicated to the device 1 resides in byte three. The identifier, i.e. the HASH result of the device from which the information in the SDO signal are intended, resides in bytes four through seven.

Since a DOMAIN DOWNLOAD is usually started with the assistance of an SDO signal in CANOPEN, whereby the addressed device expects the transmission of data, but this is not to be implemented in the case of the method for identifying and initializing devices connected to the can-bus 8, the first SDO signal is followed at a time interval of approximately 100 ms by a second SDO signal in the form SDO_XXX ABORT with XXX as space holder for the node number of the device to be addressed, causing the DOMAIN DOWNLOAD that was implemented to end.

In the following comments about this and further exemplary embodiments, the content of SDO signals is indicated only insofar as necessary to distinguish the device to which such an SDO signal is sent and the information to be communicated. Therefore, only the node number as destination address, byte three with the node number of the device to be transmitted or the request for a re-implementation of the HASH function and the content of bytes four through seven with the identifier as HASH-X shall be indicated.

In the exemplary embodiment, the microcontroller 10 transmits the SDO signal SDO_020 020, HASH-1, which means that the device with the node number 020 (SDO_020) and the identifier HASH-1 is addressed, whereby the device is informed in byte three that it can keep its node number 020 since this was not yet assigned and is thus unique.

When the device 1 receives the first SDO signal from the microcontroller 10, it ends the cyclical transmission of its emergency signal and can accept the new node number transmitted to the device 1 with the SDO signal. In the present exemplary embodiment, however, the device 1 can keep its original node number 020 since such a node number had not yet been assigned.

After the reception of the SDO_020 ABORT, the device 1 acknowledges the reception and the acceptance of the node number to the microcontroller 10 with a further emergency signal. In the exemplary embodiment, the emergency signal thus has the form EMERGENCY 020, HASH-1. After the reception of the emergency signal, the microcontroller 10 accepts the device 1 into the operation of the can-bus 8, so that the device 1 switches from the pre-operational status into the operational status, and a data exchange between the microcontroller 10 and the device 1, or between the device 1 and other devices accepted into the operation of the can-bus 8, is possible.

Figure 3:
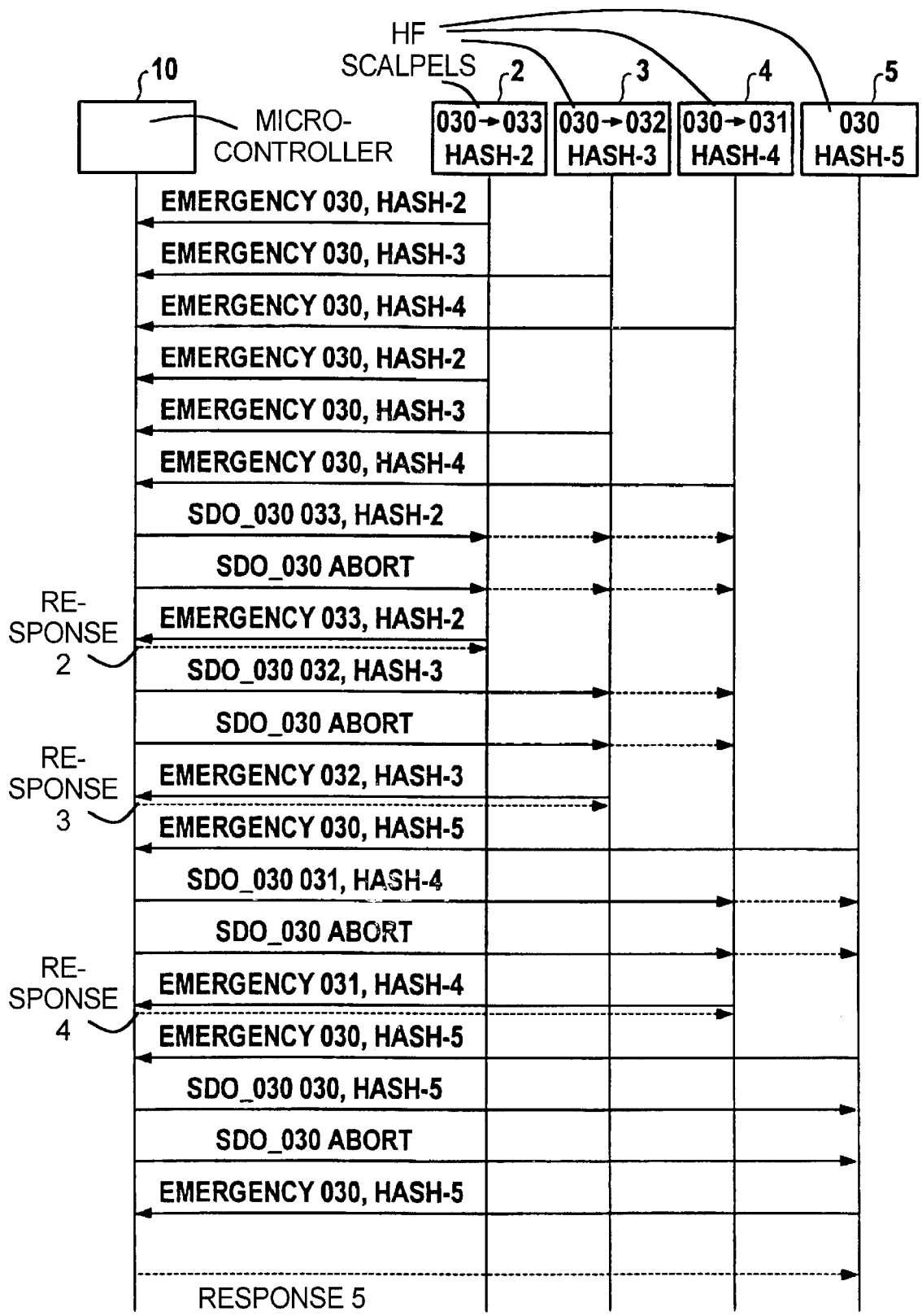
FIG. 3 is a schematic illustration of the executive sequence of a logon of four devices of the same type at the communication system of FIG. 1.

FIG. 3 schematically shows the executive sequence of a logon of four further devices 2 through 5 of the same device type with identical node numbers 030 but different manufacturer's names and serial numbers at the microcontroller 10 of FIG. 1 via the can-bus 8. In the present exemplary embodiment, the devices 2 through 5 are HF scalpels.

At first, each of the devices 2 through 5 is in the pre-operational status. The devices 2 through 4 cyclically transmit emergency signals to the microcontroller 10 at time intervals of one second. The emergency signal of the device 2 has the form EMERGENCY 030, HASH-2; the emergency signal of the device 3 has the form EMERGENCY 030, HASH-3; and the emergency signal of the device 4 has the form EMERGENCY 030, HASH-4. Each of the devices 2 through 4 has thereby executed a HASH function, for example the aforementioned HASH function, on its ASCII string comprising the manufacturer's name and the serial number, which results in HASH-2 for the device 2, HASH-3 for the device 3 and HASH-4 for the device 4 as identifiers. When the microcontroller 10 has received each of the emergency signals with the same content of the devices 2 through 4 at least twice, it initially transmits an SDO signal SDO_030 033, HASH-2, followed by an SDO signal SDO_030 ABORT. The SDO signal is thereby provided for the device with the node number 030 and the identifier HASH-2, i.e. for the device 2, and contains the information to modify the node number 030 to the node number 033. After reception of the second SDO signal, the device 2 acknowledges the modification of the node number to 033 by sending an emergency signal with the content EMERGENCY 033, HASH-2 to the microcontroller 10. Subsequently, the microcontroller 10 accepts the device 2 with the node number 033 and the identifier HASH-2 into the operation of the can-bus 8.

The microcontroller 10 deals with the device 3 in the same way in that, after at least twice receiving the emergency signal EMERGENCY 030, HASH-3, it sends an SDO signal in the form SDO_030 032, HASH-3 to the device 3 followed by an SDO_030 ABORT. The microcontroller 10 thus solicits the device 3 to modify its node number 030 into the node number 032. By transmitting an emergency signal in the form EMERGENCY 032, HASH-3, the device 3 subsequently acknowledges the modification of the node number into the node number 032 to the microcontroller 10, whereupon the microcontroller 10 accepts the device 3 with the node number 032 and the identifier HASH-3 into the operation of the can-bus 8.

In the exemplary embodiment, the microcontroller 10 receives a further emergency signal in the meantime from a device 5 in the form EMERGENCY 030, HASH-5 to which the microcontroller 10 does not initially react.

The microcontroller 10 sends a further SDO signal in the form SDO_030 031, HASH-4 followed by an SDO_030 ABORT to the device 4 in which the device 4 is requested to change its node number 030 to 031. With an emergency signal in the form EMERGENCY 031, HASH-4, the device 4 subsequently acknowledges to the microcontroller 10 that it has changed the node number to 031 and considers this as its node number over the further course. After reception of this emergency signal, the microcontroller 10 also accepts the device 4 with the node number 031 and the identifier HASH-4 into the operation of the can-bus 8.

If, in the meantime, the microcontroller 10 receives an emergency signal of the device 5 with the same content at least a second time, then it sends the device 5 an SDO signal in the form SDO_030 030, HASH-5, followed by an SDO_030 ABORT, in which the microcontroller 10 informs the device 5 that it can keep its node number 030. By transmitting an emergency signal in the form EMERGENCY 030, HASH-5, the device 5 subsequently informs the microcontroller 10 that it is keeping the node number. The microcontroller 10 also accepts the device 5 into the operation of the canbus 8. After acceptance of the devices 2 through 5 into the operation of the can-bus 8, these are in the operational status.

In the exemplary embodiment for four devices of the same type with the initially same node number 030 shown in FIG. 3, it is thus clear that new node numbers were variably assigned, so that an unambiguous node number for the communication between the respective device and the microcontroller 10, or between the devices themselves, was allocated to each device. A range of four node numbers, namely 030 through 033, is provided for the devices 2 through 5 of the same type. The last device 5 accepted into the operation of the can-bus 8 thus can keep its original node number, whereas the others must modify their node numbers so that they lie in the range provided for this type of device and are unique.

Figure 4:
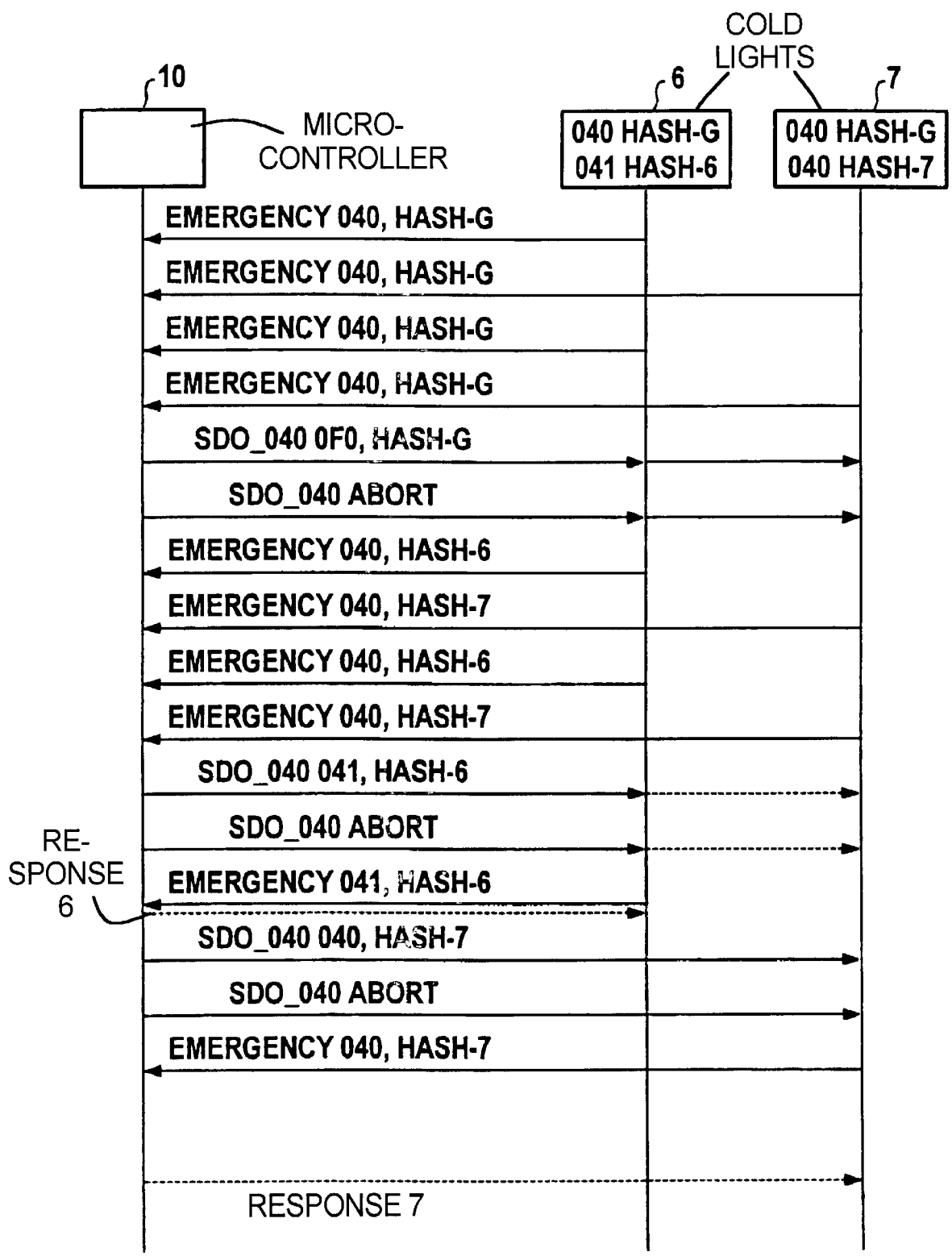
FIG. 4 is a schematic illustration of the executive sequence of a logon of two devices of the same type at the communication system of FIG. 1.

FIG. 4 schematically shows the executive sequence of a logon of two devices 6, 7 of the same type at the microcontroller 10 via the can-bus 8. In the exemplary embodiment, the devices 6 and 7 are cold lights. In addition to the node number 040, the device 6 thereby exhibits a manufacturer's name 6 and a serial number 6; in addition to the same node number 040, the device 7 exhibits a manufacturers name 7 and a serial number 7. Both devices are initially in the pre-operational status.

At the beginning of the inventive method, the devices 6, 7 in the present exemplary embodiment cyclically transmit emergency signals with the same content in the form EMERGENCY 040, HASH-G. This exemplary embodiment illustrates the extremely improbable case (that should indeed be referred to as only theoretical), namely that the execution of the HASH function of the ASCII string of the device 6 and the execution of the HASH function on the ASCII string of the device 7 have led to the same HASH results, namely HASH-G. In this case, the microcontroller 10 cannot recognize, on the basis of only the emergency signals, that two different devices want to log on for communication via the can-bus 8. The microcontroller 10 recognizes that two different devices want to log on by evaluating the time occurrence and the time offset of the cyclical emergency signals of the devices 6 and 7, so that it can assign the one cyclical emergency signal to a first device and the other cyclical emergency signal to a second device. The microcontroller 10 can not distinguish which emergency signal is being transmitted by which device.

When the microcontroller has thus received a number of cyclical emergency signals with the same content and recognized on the basis of the time occurrence and the time offset that two devices with the same node number and same identification number want to log on, the microcontroller 10 transmits an SDO signal in the form SDO_040 OFO, HASH-G followed by an SDO_040 ABORT. By means of the SDO signal the microcontroller 10, in the form of the identifier OFO in byte three, solicits the devices 6, 7 with the node number 040 and the identifier HASH-G to modify their identifiers. In response to this message, the devices 6, 7 again implement the HASH function on their respective ASCII strings with the variation of a parameter. In the case of device 6, this leads to the result HASH-6 and, in the case of the device 7, leads to the result HASH-7. The devices subsequently send emergency signals again, but now with the content EMERGENCY 040, HASH-6 in the case of the device 6 and EMERGENCY 040, HASH-7 in the case of the device 7. When the microcontroller 10 respectively receives the second emergency signal with the same content from the devices 6 and 7, it sends an SDO signal with the content SDO_040 041, HASH-6 to the device 6 followed by an SDO_040 ABORT in that it now informs the device 6 identified by the HASH result HASH-6 to change its node number to 041. By transmitting an emergency signal with the content EMERGENCY 041, HASH-6, the device 6 acknowledges to the microcontroller 10 that it has changed its node number to 041. Subsequently, the microcontroller 10 accepts the device 6 into the operation of the canbus 8. Since, in the exemplary embodiment, a range of only two node numbers, namely 040 and 041, is provided for the devices 6, 7 of the same type, the microcontroller 10, by transmitting an SDO signal in the form SDO_040 040, HASH-7 followed by an SDO_040 ABORT, informs the device 7 that the device 7 now identifiable via the identifier HASH-7 can keep its node number 040. The device 7 confirms the node number 040 for the microcontroller 10 by transmitting an emergency signal with the content EMERGENCY 040, HASH-7. Subsequently, the microcontroller 10 also accepts the device 7 into the operation of the can-bus 8.

It is thus clear that the assigning of node numbers to devices connected to a communication system can be undertaken without intervention of a person given the inventive method, and the execution of the inventive method assures that only a unique node number is allocated to each device.

The inventive method has been described above with reference to the example of CANOPEN. The inventive method, however, is not limited to CANOPEN but can also be applied to other communication systems, whereby standard services of the communication system are preferably used for the communication between the devices and a data processing means.

The identifier of the logon signal need not necessarily contain encoded information.

When the case that two devices transmit logon signals with the same node number and identical identifier can be precluded, a cyclical transmission of the logon signal can be foregone.

In order to preclude the case that at least two devices cyclically transmit logon signals with the same node number and identifier at identical points in time, so that the data processing means, even given an evaluation of the time occurrence of the logon signal, cannot tell that two different devices want to log on, an operation can be provided that calculates a specific time offset for each device, the device beginning to transmit emergency signals after this elapses after the respective device has reached the pre-operational status. For example, such an operation can be to reduce the result of the HASH function to a three-place number and dividing it by two. The result of this operation then forms the time offset.

In the case of CANOPEN, moreover, the least significant four digits of the HASH result need not necessarily be used as the identifier. Other digits of the HASH result can be employed.

If technically possible, moreover, more than four digits can also be employed as the identifier.

Further, a range of node numbers for devices of the same type need not necessarily be provided.

The above-cited time sequence of the logons of the devices 1 through 7 at the microcontroller 10 are only one example of a suitable sequence.

The inventive method, moreover, can also be applied to workstations or systems outside the medical field, for example networks of computers, and the data processing means need not necessarily be a microcontroller but can also be some other type of computer unit.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for identifying and initializing a plurality of devices in a communication system comprising the steps of:
    (a) providing a plurality of devices and a data processor and connecting said plurality of devices for data exchange with each other and with said data processor in a communication system;
    (b) transmitting a logon signal from each device, comprising a node number and a device identifier, from each device connected in said communication system to said data processor;
    (c) at said data processor, checking said node number for uniqueness from each device which transmitted a logon signal;
    (d) upon identification of any node number in step (c) which is not unique, defining a unique node number for the device which transmitted the node number which is not unique dependent on said device identifier for said device which transmitted the node number which is not unique;
    (e) transmitting an answerback of said node numbers from said data processor to the respective devices which transmitted a logon signal;
    (f) at each device, acknowledging receipt of the answerback of said node number; and
    (g) upon receiving said acknowledgment at said data processor, accepting each device which transmitted the acknowledgment in step (f) for operation in said communication system.

2. A method as claimed in claim 1 wherein step (a) comprises connecting said plurality of devices and said data processor in a CANOPEN communication system as said communication system.

3. A method as claimed in claim 1 wherein said communication system comprises services pre-defined by said communication system, and comprising conducting all communications between said devices and said data processor in steps (b), (e) and (f) using said services.

4. A method as claimed in claim 3 wherein step (a) comprises connecting said plurality of devices and said data processor in a CANOPEN communication system as said communication system, and wherein the communications for identifying and initializing said devices between said devices and said data processor in steps (b), (e) and (f) are conducted using emergency and SDO signals of said CANOPEN communication system.

5. A method as claimed in claim 1 wherein step (b) comprises transmitting said logon signal with said identifier containing encoded information.

6. A method as claimed in claim 5 wherein each of said devices has a unique ASCII string allocated thereto, and comprising the additional steps, at each device, for encoding information for said identifier by converting said ASCII string into a number, having a plurality of digits, using a HASH function of programming language C, and using some of said digits of said number to form said encoded information comprising said identifier.

7. A method as claimed in claim 1 wherein step (b) comprises cyclically transmitting said logon signals from the respective devices to said data processor.

8. A method as claimed in claim 7 wherein step (c) comprises checking whether any two of said devices have transmitted identical logon signals dependent on a cyclical occurrence of the respective logon signals at said data processor.

9. A method as claimed in claim 1 wherein said plurality of devices include devices designated as being substantially a same type, and comprising the step of, at said data processor, providing a range of node numbers for said devices designated as being of substantially the same type.

10. A method as claimed in claim 1 comprising providing a microcontroller on a PC plug card as said data processor.

11. A method as claimed in claim 1 comprising providing medical devices of a medical workstation as said plurality of devices.

* * * * *